(12) United States Patent
Sanderson

(10) Patent No.: X5962
(45) Date of Patent: May 15, 1830

(54) PASTE PAPER FOR BAND-BOXES, & C.

(76) Inventor: Isaac Sanderson

Isaac Sanderson of Milton Massachusetts
Letters Patent.
The Schedule referred to in these Letters Patent and making part of the same containing a description in the words of the said Isaac Sanderson himself of his improvement in manufacturing Paste Board, Band Box Paper and other Brown Paper.

To all to whom these presents shall come. Isaac Sanderson of Milton in the County of Norfolk and Commonwealth of Massachusetts, Paper-maker, sends Greeting. Be it Known that I the said Sanderson have invented, discovered and applied to use a new and useful art and improvement in the manufacturing of Paste Board. Band Box paper, and other Brown paper. which art and invention is explained and described as herein after set forth. that is to say. Such paper may be made from salt meadow grass. cut and dried in the manner for making hay. and prepared as follows. namely.
Take a convenient quantity of such grass either sedge or thatch. black grass. or fox grass so cut and dried and put it into a vessel prepared for boiling it in Lime water: pour into the vessel or cistern a quantity of Lime water sufficient for the ^salt Hay made by mixing quick lime with water in about the proportion of a peck of lime to a Hogshead of water:
This quantity of water will serve for about two hundred pounds of salt Hay. Boil the salt Hay in the lime water thus prepared for about two Hours and then take it out and put it into the Engine of the paper mill and beat it with the Engine until it is cut up into pieces about two inches in length, then put into the Engine, train or spermaceti oil in the proportion of about half a pint for two hundred pounds of salt Hay. and beat the mixture for about half an hour with the Engine. and then put into the Engine Pot ash dissolved in water in the proportion of about six pounds of pot ash for two hundred pounds of salt Hay. mixed previously with water in the proportion of about a gallon of water to six pounds of Pot ash.

After putting in the Pot ash beat the whole in the Engine until the salt hay is beat into a pulp sufficiently fine for making Brown paper.

And whereas lime water and Pot ash and oil have been used in preparing other materials for making paper. or may have been so used. and dry salt Hay in a raw state. and not boiled and prepared as aforesaid. has been used in small quantities mixed with ropes or other materials for making brown paper. or may have been so used. It is understood, and I the said Sanderson do expressly declare that the using of lime. or lime water. Pot ash or oil in preparing other substances than dry salt hay for making paper is not claimed by me as a new invention or discovery. nor is the using of salt hay in a raw state in the manner it has heretofore been used with other materials. claimed by me as a new discovery or invention. But what is claimed as a new invention or discovery by me. is the making of brown paper entirely or chiefly from salt hay boiled and prepared as aforesaid.

The quantity and proportion of lime pot ash and oil before mentioned is deemed best. But it may be varied at the discretion of the operator.

Different kinds of Brown paper may be thus made. namely wrapping paper. Band Box paper. Book binders boards. paste board of any suitable thickness. and brown paper which will serve for various other purposes.

In witness whereof. I the said Isaac Sanderson have hereto set my hand and seal this fourteenth day of April in the year of our Lord Eighteen hundred and thirty Exd. Witnesses
W.J.C. John W. Harkins
Isaac P. Osgood Isaac Sanderson 67 [illegible] Words Patented May 15. 1830.